Nov. 26, 1963  H. K. ANDERSON  3,111,870
POWER APPARATUS
Filed Feb. 13, 1961
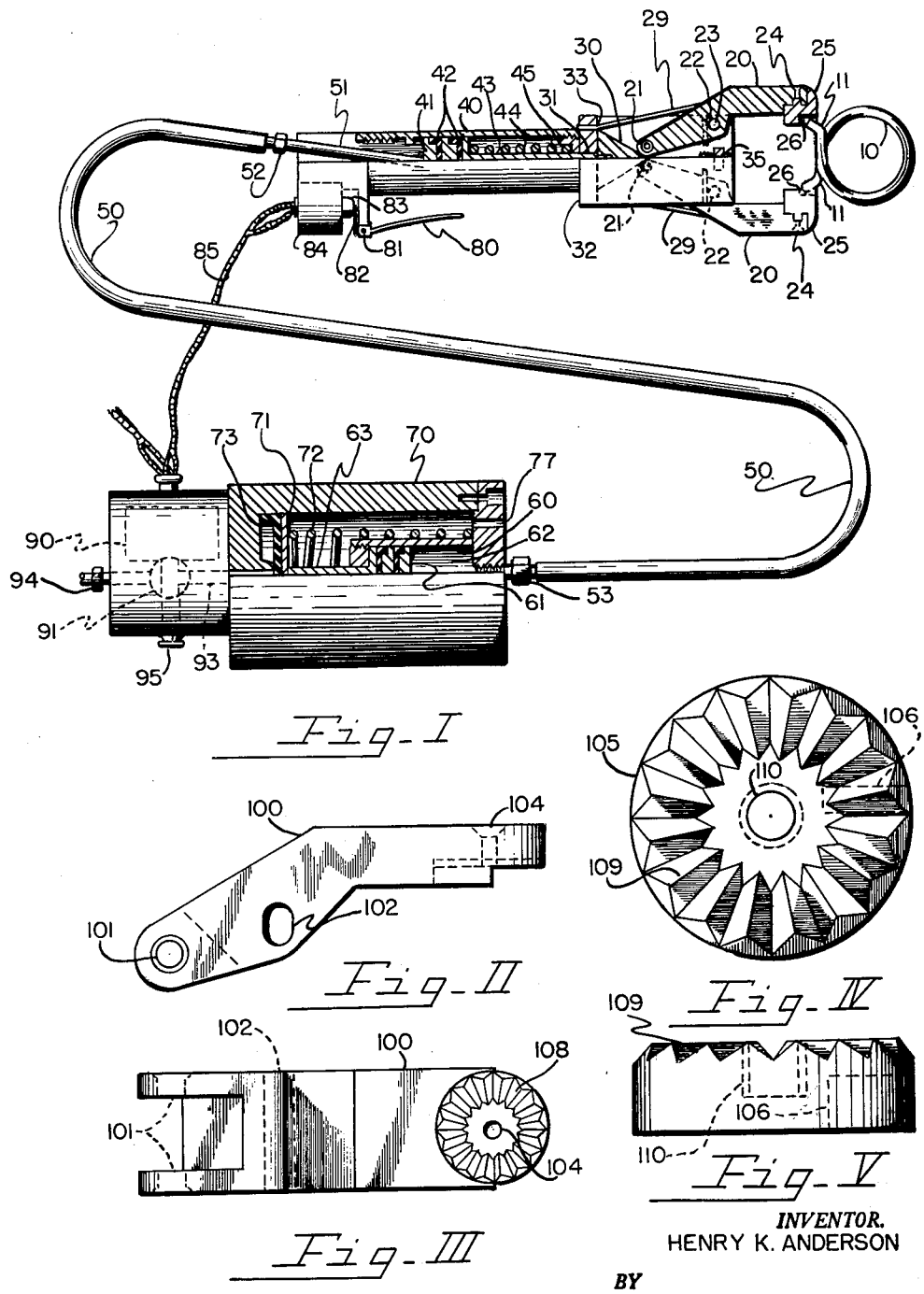
INVENTOR.
HENRY K. ANDERSON
BY
Marshall & Wilson
ATTORNEYS the Main St., Clyde, Ohio
United States Patent Office 3,111,870
Patented Nov. 26, 1963

3,111,870
POWER APPARATUS
Henry K. Anderson, 219 S. Main St., Clyde, Ohio
Filed Feb. 13, 1961, Ser. No. 88,747
8 Claims. (Cl. 81—9.3)

This invention relates to clamping, clinching or other movable jaw type apparatus, such as hose clamp spreaders, in general, and particularly to an embodiment of power driven, portable apparatus for spreading several different sizes of hose clamps comprising a length of spirally wound spring wire.

Spirally wound hose clamps are available in a great variety of sizes from as small as three-eighths of an inch in diameter to two and five-eighths of an inch in diameter on up. Since these clamps are made in a spirally wound spring configuration and may be made of spring steel it can be appreciated that the force needed to be applied to the clamp wings to spread the clamps prior to putting them onto the hoses, particularly as the diameter of the hose clamp grows larger. Therefore, hand operated hose clamp assembly tools such as shown in United States Patent No. 2,898,789, issued August 11, 1959, are of limited use when a great number of hose clamps must be placed on hoses. Power operated hose clamp assembly tools in the past have been of a massive, stationary machine types suitable only for placing clamps on hoses when the hoses are capable of being inserted into the hose clamp assembly machine. However, there is a rapidly expanding use of hoses in industries where the hose itself connects two chambers. For example, hoses are utilized in connecting the radiator to the engine block in the automotive industry, as well as hoses connecting heaters and other equipment requiring the transmission of a fluid or gas from one point to another.

It is, accordingly, an object of this invention to provide a power operated hose clamp assembly tool which is portable, easily manageable in tight spots, and having a number of novel features incorporated therein which improves the operation of the hose clamp assembly tool over the prior art.

It is a further object to provide apparatus able to accept various type and sizes of jaws which are readily interchangeable or to provide jaws which are made in a manner to be described hereinafter which will accept readily interchangeable inserts.

Another object of this invention is to provide the closure or jaw means with a structure which utilizes a biasing spring tension after the hose clamp has been inserted so that the clamp is held in position in the jaws until the power is actuated and closes the jaws to open the clamps.

It is a further object of this invention to provide apparatus of the type described above having jaws in which the working angle of acceptance of the hose clamp wings may be readily adjusted and locked in as desired.

It is a still further object of this invention to provide a safely operating unit. The wing clamps are held securely in a closed position and in case of power failure the jaws or clamping means of this apparatus are under enough tension so that the part is released slowly and the spring clamp will not fly out causing possible injury to the operator or the equipment.

Since the spring hose clamps of the particular type to be set forth herein have a tremendous side thrust or tendency to yaw when pressed open, it is an object of this invention to provide means to overcome the twist and reduce the wear caused by this side thrust or tendency to yaw. It is a further object of this invention to provide a unit which speeds installation of hose clamps since the cycle ends with the clamping means or jaws in an open position to receive another hose clamp.

In accordance with the above objects there is described herein clamping apparatus comprising a pair of pivotally mounted members including a pair of opposed jaw means having formed therein cooperative, opposed grooves in adjacent opposed surfaces. Leaf spring means are utilized which are operative to bias the pivotally connected members so that the jaw means are in an open position. A cam means, which may take the form of a wedge, is positioned to act upon the ends of the pivotally mounted members opposite the jaw means. The opposite ends of each of the pivotally mounted members may be supplied with rollers so that the cam or wedge means may easily act against the rollers and reduce the wear caused thereby. The specific embodiment of the cam means shown herein is actuated through a hydraulic system. The hydraulic system comprises three cylinders having disposed therein three pistons, respectively. With the jaw members in a normally open position a first piston disposed in a first cylinder, connected to the wedge means, is biased toward a position which takes the cam or wedge means away from the roller contacts of the pivotally mounted jaw members by a coil spring. This position generally also is one in which the first cylinder is completely exhausted of fluid. A second piston in a second cylinder is biased to a position which allowed the second cylinder to be filled with the fluid of the hydraulic system, also by a coil spring means. Flexible connecting means provides means for the fluid to communicate between the two cylinders. This may be in the form of a flexible hose made of material to withstand the pressures to be exerted by the hydraulic system. In order to advance the second piston in the second cylinder to cause the exchange of fluid from the second cylinder to the first cylinder and cause the wedge means to be advanced, a third or air cylinder is utilized having therein a third piston or ram. The third cylinder may be concentric around the second cylinder thus utilizing the same coil spring means for biasing the third piston to a closed position and thus fully exhausting the third cylinder.

The pressurized air-receiving side of the third cylinder is connected to a source of air pressure via a solenoid operated valve. A solenoid operated valve of this invention may be a two-way valve which is opened either to an exhaust tube or to the source of air under pressure. The solenoid valve may be controlled by a microswitch on the handle of the portable gripping apparatus which includes the first cylinder, first piston and cam or wedge means therein. Since all of the piston means are biased by the coil springs in a first direction, with no air pressure applied, the cam means is withdrawn from a force exerting position on the roller ends of the jaw means and no pressure is applied to close the jaws. During this time, then, the leaf spring means operate to hold the jaws in an open position.

In a first embodiment shown herein the pivotally mounted members each comprises a bell crank lever arrangement having a roller at one end, a jaw means or gripping surface at the other end, a pivot means located intermediate the roller and jaw ends. The jaw means may include means for inserting inserts adapted to be utilized with various size hose clamps. However, it is to be understood that the cooperative opposed grooves to receive a hose clamp may be formed in the bell crank member itself rather than supplying inserts with the grooves formed therein. The second form of a pivotal member disclosed herein comprises a bell crank lever having roller means at one end, a serrated clutch surface at the other end, and an elongated pivot slot or hole located intermediate the two ends. A screw means may be utilized to engage and pull into a locking position a jaw-insert member, with matching serrations formed therein, into a locking position with the serrated surface machined on the opposing surface of the pivotal member. A wing clamp receiving groove may be formed in each of the serrated insert members so that by unloosening the screw and rotating the jaw-insert member the grooves may be aligned at any work-angle or attack that might be needed. The elongated pivot slot or hole serves, when used in cooperation with a leaf spring or other biasing means, to allow the leaf spring to push the pivotally connected members toward each other such that the wing clamps may be inserted in the receiving grooves of either of the two embodiments of the pivotally mounted members described herein and exert a slight pressure to hold the hose clamp therein until power is applied to the jaw members as described hereinbefore.

Other objects, features and advantages of this invention will become apparent when the following description is taken in conjunction with the drawings, in which:

FIG. I is a front elevation of a first embodiment of this invention, partly in section;

FIG. II is a front elevation of a second embodiment of a pivotal member;

FIG. III is a bottom view of FIG. II;

FIG. IV is an enlarged bottom view of a jaw insert to be utilized with the pivotal member of FIG. II; and FIG. V is a side elevation of FIG. IV.

Referring to the drawings there is shown in FIG. I a front elevation of the power clamping apparatus embodying the teachings of this invention.

Although the teachings of this invention are described with respect to spreading a spirally wound hose clamp 10 having clamp wings 11, it is to be noted that the novel features described herein may be utilized within the scope of this invention in other types of power clamping apparatus.

The hose clamp 10 of FIG. I has clamp wings 11 which are received by grooves 26 formed in jaw inserts 25. The jaw inserts 25 are securely held in place by screws 24 in the pivotable members 20. The pivotable members 20 are, in the embodiment shown, shaped in the form of bell crank levers having the jaw or gripping means at one end and roller means 21 at the other end. The jaw means of the pivotable members, of course, may have grooves 26 formed directly in the pivotable members 20. However, in order that a single power operated tool may accommodate the largest number of sizes of wing clamps 10 as possible with the smallest dissassembly time possible, the inserts 25 are utilized which may be changed to accommodate a particular size. The pivotable members 20 are mounted on pins 23 which are inserted in pivot holes 22 formed in the pivotable members 20. As to be explained hereinafter in a second embodiment of the pivotable members the pivot holes 22 my be formed as slots rather than circular holes in order to provide a tensioning against the clamp wings 11 to hold the clamp 10 in place before force is applied to the pivoted members. The pivot pins 23 are supported on a body member 32.

The body member 32 may have slots 33 formed therein to receive leaf springs 29. The leaf springs 29 bear on the bell crank or pivotable members 20 at a position to the rear of the pivot holes 23 so that the leaf springs 29 cooperate to hold the roller ends 21 of the pivotable members 20 in their most closed position.

Secured to the body 32 is a cylinder 40 having a piston 41 disposed therein. The piston 41 is connected to a rod 43 which is journalled in an aperture or bearing 31 of the body member 32. The rod 43 is connected to a cam or wedge member 30. Gasket means or other ring materials 42 are disposed around the circumference of the piston 41 to provide a good seal on each side of the piston. A coil spring 44 is located around the rod 43 and is received by a spring retaining aperture 45 within the cylinder 40. The spring 44 provides a bias which keeps the piston 41 at the rear of the cylinder 40. The cylinder 40 communicates with a second cylinder 60 through a tube 51, a flexible hose or other communicating means 50 and fittings 52, 53. The cylinder 60 has disposed therein a piston 61 having peripheral gasket ring, or other sealing means 64. In the position shown in FIG. I the interior 62 of the cylinder 60 is entirely filled with fluid while the interior of the cylinder 40 is exhausted. The flexible connecting means 50 is also filled with fluid so that when a force is exerted upon the piston 61 force is immediately transmitted by means of the hydraulic fluid through the flexible connecting means 50 to the interior of the cylinder 40 and against the receiving or rearward face of the piston 41.

The piston 61 is connected to a rod 63 which is in turn connected to a piston or ram 71 disposed within a cylinder 70 which is located concentrically around the cylinder 60. By locating the cylinder 70 concentric with cylinder 60 the same biasing spring means 72 is operative to provide a spring bias to keep the piston 71 to the rear of the cylinder 70 and the piston 61 at the rear of the cylinder 60 when the apparatus is in the non-power exerting portion of its cycle. The piston 71 is provided with gasket sealing means 71 around its periphery to avoid leakage of hydraulic fluid of gas around the periphery of the piston 71. An aperture 77 is provided at the front of the cylinder 70 so that the piston 71 may return via the biasing spring 72 to the position as shown when the inlet 93 of the cylinder is connected with an exhaust tube 95.

A solenoid operated valve designated generally at 90 is operative to connect the inlet 93 of the cylinder 70 to either a pressurized air inlet 94 or to an exhaust outlet 95. The two-way action of the valve is represented diagrammatically at 91. The solenoid operated valve is actuated in response to the depression of a hand lever 80 pivoted at 83 and having a flange 82 which depresses button 83 of switch 84 when the lever 80 of the triggering mechanism is depressed. The switch 84 connects the solenoid operated valve 90 to a source of electrical power through the leads 85.

In operation the operator places a hose clamp 10 such that the clamp wings 11 are engaged by the grooves 26. The trigger lever 80 is depressed actuating the solenoid valve 90 so that the inlet 93 of the cylinder 70 is connected to the pressurized air inlet 94. The pressurized air from the inlet 94 forces the piston 71 forward in the cylinder 70 overcoming the biasing force of the spring 72. The forward movement of the piston 71 also causes forward movement by force exerted via the connecting rod 63 of the piston 61. The movement of piston 61 exerts pressure via the hydraulic fluid in the interior of the cylinder 60 in the flexible connecting means 50 on the rearward face of the piston 41 within the cylinder 40. The piston 41 is thus moved forward and overcomes the bias of the spring 44 and via the connecting rod 43 advances the cam or wedge means 30 between the rollers 21 of the pivoted members 20. The jaw means at the opposite end of the pivoted members 20 thus are forced together and exert a force on the clamp wings 11 which opens the hose clamp 10 and allows the insertion of a hose to be clamped or allows the clamp 10 to be placed in a clamping position. The distance that the jaw ends of the pivoted members 25 traverse, that is, whether they completely close or not, is controlled by a set screw means 35. The set screw means located within the body 32 supporting the pivoted members 20 may be advanced or backed out of its position as shown in FIG. I to determine the distance forward that the cam or wedge means 30 can advance before being stopped by abutting against the stopping means 35.

After the clamp is installed the operator releases the trigger lever 80 and the solenoid 90 returns to its normal position of connecting the inlet 93 of the cylinder 70 with the exhaust tube 95. The air pressure that has forced piston 71 to the right is now released and the spring biasing force of the spring 72 starts returning the piston 71 to its original position at the left of cylinder 70. A safety factor is in operation here preventing mis-operation of the device and this is accomplished in the way that the hydraulic fluid is returned from the interior of cylinder 40 to the interior of the cylinder 62. As the piston 71 advances to the left to its initial or normal position the piston 61 is also advanced to the left. However, the piston 61 now provides a vacuum within the interior of the cylinder 60 which cooperates with the spring biasing force of the spring 44 surrounding the rod 43 of the piston 41 to retard any quick or sudden movements backward, and thus to retard any quick or sudden movements of the jaws or pivoted members 20. Although the action just described operates to quickly return the respective pistons to their initial positions within the cylinders, it is not sufficient with sufficient speed to cause any sudden movements of the jaws as to inflict injury on the operator or the equipment.

Referring to FIGS. II through V there is shown a second embodiment of a pivoted means 100 suitable for use in the apparatus shown in FIG. I. The pivoted member 100 again may be advantageously shaped in the form of a bell crank lever when viewed from the front elevation, having means for inserting and holding rollers in apertures 101 formed at the rear end of the pivotable member 100.

A slot 102 is formed in the pivoted member 100 intermediate the rear and front ends and this slot may be utilized also in the pivoted members 20 shown in FIG. I. The slot 102 cooperates with the pins 23 and the leaf springs 29 so that when the jaws are in a normally open position the leaf springs 29 press the pivoted members 100 closer together so that the pivot pin 23 is in the upper portion of the upper pivoted member 100 and in the lower portion of the lower pivoted member 100. The slots are of the length so that slight finger pressure will allow the insertion of the clamp wings 11 and the leaf springs 29 will furnish a sufficient biasing force to hold the clamp wings 11 in place until the operator is ready to actuate the power portion of the apparatus. Once the power is applied the cam or wedge means 30 advances against rollers 21 and before pressure is applied on the clamp wings 11 received in the grooves 26 the biasing force of the leaf springs 29 is overcome and the pivoted members move so that the pivot pins 23 are now resting at the innermost position of the slot and then the jaw means of the pivoted members close opening or spreading the hose clamp 10.

As best seen in FIG. III serrations 108 are machined in the jaw end of the pivoted member 100. An enlarged view of a jaw insert 105 having matching serrations 109 is shown in FIGS. IV and V. The jaw insert 105 is placed so that its serrations match the serrations 108 of the pivoted member 100 and it is retained in a desired position by the insertion of a screw in the screw hole 104 which engages screw threads 110 in the insert 105. As may be seen the serrations provide, when the engaging screw 104 is tightened, a locking feature holding the jaw insert in one place so that, for example, a wing clamp receiving groove 106 may be positioned in the zero degree plane formed by a perpendicular plane intersecting the pivot axis through the slot 102 and extending through the center of the groove 106. Considering this the zero degree position it may be seen that the wing clamp receiving grooves 106 may be readily changed to any work angle desired from the zero degree plane to the left or to the right by simply loosening the locking screw engaging the tapped hole 110, separating the insert and the pivoted member 100 so that the serrations do not engage, and rotating the jaw insert 105 to the desired position. This provides a 180 degree swing at least, in the embodiment shown, which would be very useful when placing hose clamps in crowded quarters such as under the hood of an automobile.

It should be noted that the switch or actuating means 84 is not confined to a switch operable from and attached to the portable section of the toop, or, to a switch and lever means as shown. Other types of switches may be utilized. For example, a foot operated switch may be best suited for use if the tool is being used in conjunction with assembly line techniques.

There has thus been disclosed tool apparatus comprising, in generic terms, pivot means, pivotable members having formed therein apertures to receive said pivot means, at least one of said apertures being elongated to allow lateral movement of one of said pivotable members, body means supporting said pivot means, and biasing means including leaf spring means attached to said body adapted to urge said one pivotable member toward one end of said elongated aperture. The pivotable members have, in the embodiment shown, clamp receiving grooves formed in opposed surfaces. The opposed surfaces may also be adapted to receive interchangeable jaw inserts. The jaw inserts may be rotatably mounted so that the working angle of the tool may be changed. Positioning means such as the matching serrated surfaces on the jaw insert and the pivotable member may be used in conjunction with a locking screw to provide selective locking means to hold each jaw insert at one of a plurality of predetermined positions of rotation. Movement of the pivotable members is provided by cam means acting upon the ends of said pivotable members opposite the gripping ends.

As power operated apparatus the invention may be described as a portable tool with the cam means and pivotable members contained therein with first hydraulic means adapted to actuate said cam means. The tool is operated by a remote power means including a second hydraulic means, air ram means, and value means responsive to automatic or operator controlled switching means for connecting the air ram means to a source of air under pressure. Flexible means is provided to connect the first hydraulic means to the second hydraulic means.

In conclusion it is pointed out that while the illustrated example constitutes a practical embodiment of my invention, I do not limit myself to the exact details shown, since modification of the same may be made without departing from the spirit of this invention.

Having described the invention, I claim:

1. Tool apparatus, comprising; a pair of work receiving members; pivot means; one of said work receiving members having an aperture formed therein to receive said pivot means; said work receiving members having opposing jaw means which are pivotable toward each other by cooperation of the pivot means and work receiving members to perform a work operation; said aperture in said one work receiving member being elongated to allow lateral movement of said jaw means of said one work receiving member away from the other jaw means without pivoting, to enable a work piece to be engaged by said work receiving members; and biasing means adapted to yieldingly urge said one pivotable work member to one end of said elongated aperture toward the other work member to cause said work receiving members to retain said engagement of said work piece until said work operation is performed.

2. Tool apparatus, comprising; a pair of work receiving members; pivot means; one of said work receiving members having an aperture formed therein to receive said pivot means; said work receiving members having opposing jaw means which are pivotable toward each other by cooperation of the pivot means and work receiving members to perform a work operation; said aperture in said one work receiving member being elongated to allow lateral movement of said jaw means of said one work receiving member away from the other jaw means without pivoting, to enable a work piece to be engaged by said work receiving members; and biasing means adapted to yieldingly urge said one pivotable work member to one end of said elongated aperture toward the other work member to cause said work receiving members to retain said engagement of said work piece until said work operation is performed; said pair of work receiving members having clamp receiving grooves formed in said opposed jaw means.

3. Tool apparatus, comprising; a pair of work receiving members; pivot means; one of said work receiving members having an aperture formed therein to receive said pivot means; said aperture being elongated to allow lateral movement of said pivotable member on said pivot means without pivoting, to enable a work piece to be engaged by said work receiving members; biasing means adapted to yieldingly urge said one pivotable work member to one end of said elongated aperture toward the other work members to cause said work receiving members to retain said engagement of said work piece; said pair of work receiving members having opposed surfaces adapted to receive interchangeable jaw inserts; and jaw inserts each comprising a rotatable member having a clamp receiving groove formed therein; and means for selectively locking each rotatable member at one of a plurality of predetermined positions of rotation.

4. Tool apparatus, comprising; a pair of work receiving members; pivot means; one of said work receiving members having an aperture formed therein to receive said pivot means; said aperture being elongated to allow lateral movement of said pivotable member on said pivot means without pivoting, to enable a work piece to be engaged by said work receiving members; biasing means adapted to yieldingly urge said one pivotable work member to one end of said elongated aperture toward the other work member to cause said work receiving members to retain said engagement of said work piece; cam means adapted to pivot said pivotable work receiving member; first hydraulic means operatively connected to drive said cam means; and a remote power means including second hydraulic means and flexible tubing means connecting said remote power means to drive said first hydraulic means.

5. Tool apparatus, comprising; a pair of work receiving members; pivot means; at least one of said work receiving members being pivoted on said pivot means; a jaw insert having a clamp receiving groove formed therein; said pair of work receiving members having opposed surfaces, at least one such surface receiving said jaw insert; said jaw insert comprising a member mounted for rotation on said one opposed surface in a plane parallel to said one opposed surface; and means for selectively locking said rotatable member in place on said opposed surface of said work receiving member in any one of a plurality of predetermined positions of rotation allowing positioning of said clamp receiving groove for gripping at any point on the circle of rotation.

6. Tool apparatus, comprising; a pair of work receiving members; pivot means; at least one of said work receiving members being pivoted on said pivot means; a jaw insert having a clamp receiving groove formed therein; said pair of work receiving members having opposed surfaces, at least one such surface receiving said jaw insert; said jaw insert comprising a member mounted for rotation on said one opposed surface in a plane parallel to said one opposed surface; means for selectively locking said rotatable member in place on said opposed surface of said work receiving member in any one of a plurality of predetermined positions of rotation allowing positioning of said clamp receiving groove for gripping at any point on the circle of rotation; cam means adapted to pivot said pivotable work receiving member; first hydraulic means operatively connected to drive said cam means; and a remote power means including second hydraulic means and flexible tubing means connecting said remote power means to drive said first hydraulic means.

7. Tool apparatus, comprising; a pair of work receiving members; pivot means; at least one of said work receiving members being pivoted on said pivot means; a jaw insert having a clamp receiving groove formed therein; said pair of work receiving members having opposed surfaces, at least one such surface receiving said jaw insert; said jaw insert comprising a member mounted for rotation on said one opposed surface in a plane parallel to said one opposed surface; means for selectively locking said rotatable member in place on said opposed surface of said work receiving member in any one of a plurality of predetermined positions of rotation allowing positioning of said clamp receiving groove for gripping at any point on the circle of rotation; cam means adapted to pivot said pivotable work receiving member; first hydraulic means operatively connected to drive said cam means; a remote power means including second hydraulic means and flexible tubing means connecting said remote power means to drive said first hydraulic means, air ram means connected to drive said second hydraulic means, and valve means for connecting said air ram means to said second hydraulic means; means for opening and closing said valve means; and biasing means for returning said air ram means to a starting position after a closing of said valve means thereby automatically returning said work receiving members to a work receiving position.

8. Tool apparatus, comprising; a pair of work receiving members; pivot means; one of said work receiving members having an aperture formed therein to receive said pivot means; said aperture being elongated to allow lateral movement of said pivotable member on said pivot means without pivoting, to enable a work piece to be engaged by said work receiving members; biasing means adapted to yieldingly urge said pivotable work member toward one end of said elongated aperture to cause said work receiving members to retain said engagement of said work piece; cam means adapted to pivot said pivotable work receiving member; first hydraulic means operatively connected to drive said cam means; a remote power means including second hydraulic means and flexible tubing means connecting said remote power means to drive said first hydraulic means, air ram means connected to drive said second hydraulic means, and valve means for connecting said air ram means to said second hydraulic means; means for opening and closing said valve means; and second biasing means for returning said air ram means to a starting position after a closing of said valve means thereby automatically returning said work receiving members to a work receiving position.

References Cited in the file of this patent

UNITED STATES PATENTS

| 427,555 | Connor | Mar. 13, 1890 |
| 832,804 | Oneal et al. | Oct. 9, 1906 |
| 945,012 | Bernard | Jan. 4, 1910 |
| 1,421,370 | Ashworth | July 4, 1922 |
| 1,459,583 | Edstrom | June 19, 1923 |
| 1,936,263 | Pope | Nov. 21, 1933 |
| 2,086,400 | Brenizer | July 6, 1937 |
| 2,442,295 | Kuendel | May 25, 1948 |
| 2,677,982 | Arras et al. | May 11, 1954 |
| 2,684,004 | Holtzapple | July 20, 1954 |
| 2,766,631 | Van Sittert | Oct. 6, 1956 |
| 2,787,235 | Schroeder | Apr. 2, 1957 |
| 2,831,381 | Lingle | Apr. 22, 1958 |
| 2,850,926 | Jobe | Sept. 9, 1958 |
| 2,898,789 | Meese | Aug. 11, 1959 |
| 3,037,208 | Haberstump | June 5, 1962 |

FOREIGN PATENTS

| 949,833 | France | Mar. 7, 1949 |